No. 895,125.  
PATENTED AUG. 4, 1908.

J. L. THEOBALD.  
SCALE.  
APPLICATION FILED APR. 28, 1904.

2 SHEETS—SHEET 1.

Witnesses:  
Inventor:  
John L. Theobald  
By Rector & Kibben  
His Attorneys.

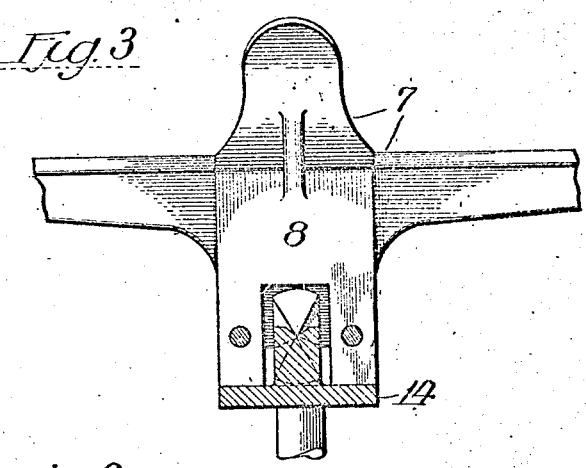
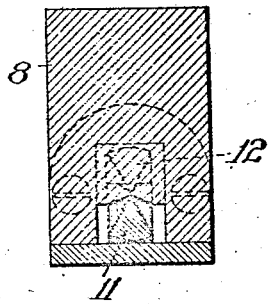
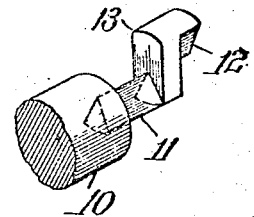
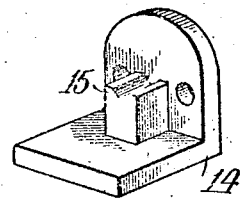

UNITED STATES PATENT OFFICE.

JOHN L. THEOBALD, OF DAYTON, OHIO, ASSIGNOR TO TOLEDO COMPUTING SCALE COMPANY, OF NEWARK, NEW JERSEY, A CORPORATION OF NEW JERSEY.

SCALE.

No. 895,125.　　　　Specification of Letters Patent.　　　　Patented Aug. 4, 1908.

Application filed April 28, 1904. Serial No. 205,397.

*To all whom it may concern:*

Be it known that I, JOHN L. THEOBALD, a citizen of the United States, residing at Dayton, Montgomery county, Ohio, have invented certain new and useful Improvements in Scales, of which the following is a specification.

My invention has relation to scales generally, and more particularly to a scale having a platform mounted on two bearings, and the object of my invention is to provide means for effectually preventing any disarrangement or disturbing of these bearings in case the load or article to be weighed should be placed on one side of the platform or pan which might ordinarily tilt such platform, raising one of the bearings from its pivots and thereby interfering with the correct indication by the scale.

In a scale made according to my invention, the pivots and bearings are so constructed and arranged that they remain in fixed relative position whether the load or article to be weighed is placed directly centrally of the platform or at one side, even on the margin thereof.

Figure 1:
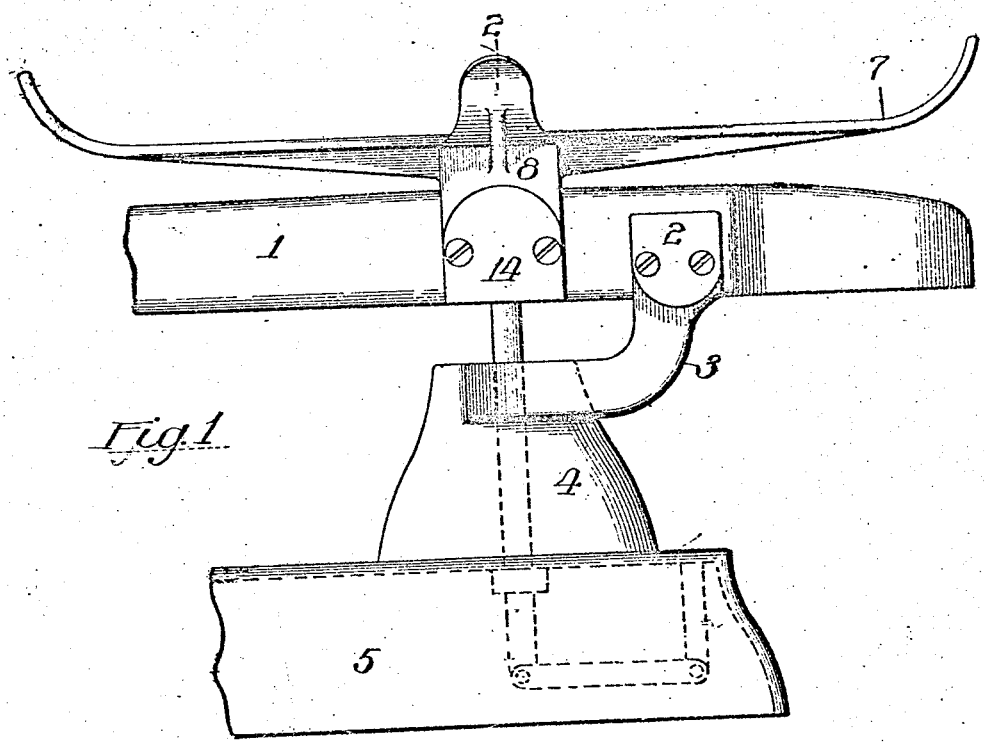
Figure 2:
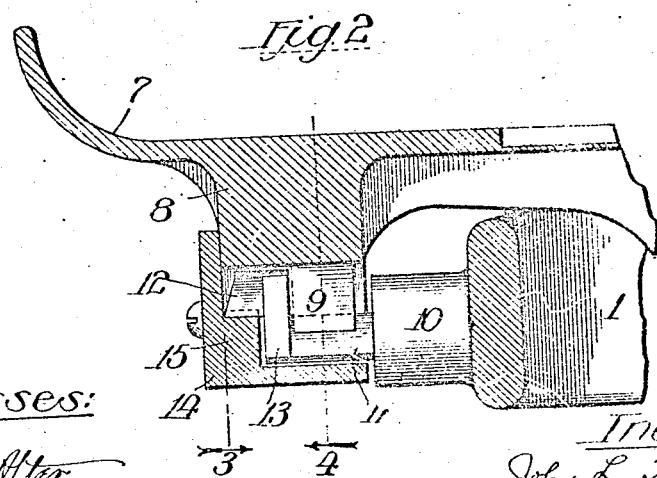

In the drawings, Figure 1 is a side elevation of a scale platform embodying my improvements; Fig. 2 a section on line 2 of Fig. 1; Figs. 3 and 4 sections respectively on lines 3 and 4 of Fig. 2; Fig. 5 a perspective view of one of the platform pivots; Fig. 6 a perspective view of one of the bearings.

For the purpose of affording a clear and comprehensive understanding of my invention, I have shown the same applied to the particular form of platform scale illustrated in the drawing, in which the scale beam may be connected to simple weighing mechanism, or mechanism of any type for both weighing and price-computing. It will therefore be understood that my invention, considered in its broader aspect is not to be held limited or restricted to the details herein shown or hereinafter described.

Referring to Figs. 1 and 2 of the drawings, the usual scale beam 1 is mounted in the ordinary bearings at 2 arranged at the upper ends of the supporting arms 3. These supporting arms are in turn supported by the post 4 rising from the base 5 of the scale or machine. The scale platform or pan (not shown) is adapted to rest upon a spider frame 7 provided at its opposite sides with depending bearing lugs or standards 8, which are upwardly slotted so as to receive and hold the knife edge bearings 9, preferably made of agate and pointing downwardly. The frame 7, however, may be considered the platform of the scale. The scale beam 1 has lateral projections 10 (Fig. 2), from which extend the upwardly projecting knife edge pivots 11 upon which the knife edge bearings 9 rest and have their movement. The bearings thus far described are those which are in common use in scales of this character, but it sometimes happens, when the load is improperly placed on the platform, that the consequent tilting of the platform frame 7 will lift the bearings 9 off their pivots 11 and possibly interfere with the proper working of the scale. To overcome this difficulty, each of the scale beam pivots is provided with two knife edges, the one already described and an additional one therebeyond. The old knife edge or pivot points upwardly while the new or additional one points downwardly, as will be understood from the following description. The new or additional knife edge or pivot marked 12 is by preference formed of the same piece of material as the other pivot and connected therewith by the vertical block 13. These knife edges 11 and 12 are constructed with their bearing edges on the same horizontal plane, and, as indicated, are arranged reversely to each other. A right-angled end plate 14 is removably secured to each of the slotted bearing lugs or standards 8 and provided with a bearing block 15 which is notched on its upper edge to form a knife edge bearing to receive the knife edge or pivot 12. The knife edge bearings 9 and 15 are pointed or arranged reversely to each other in the same manner as the pivot bearings 11 and 12.

It will be understood that any tilting tendency of the platform or pan from any cause whatsoever, which ordinarily would lift the bearings 9 off their pivots, does not affect the scale beam and the accuracy of the indicating mechanism controlled thereby, inasmuch as its pivot bearings at its ends remain undisturbed by such tilting action of the platform or pan, for the reason that the bearing block 15 and consequently the entire sets of bearings move upwardly bodily with the platform frame.

Although I have described more or less precise forms and details of construction, I do not intend to be understood as limiting myself thereto as I contemplate changes in form, proportion of parts and substitution of equivalents as circumstances may require or render expedient without departing from the spirit and scope of my invention and claims.

I claim:

1. The combination of a scale platform having knife edge bearings directed oppositely to each other and detachably connected together, and a scale beam having knife edges directed oppositely to each other and engaged with said bearings, respectively.

2. In a scale, the combination of a scale platform having depending bearing standards on opposite sides, knife edge bearings located in said standards, plates secured to said standards and provided with knife edge bearings, and a scale beam having on opposite sides a plurality of knife edge pivots coöperating with said bearings in the standards and plates.

3. In a scale, the combination of a scale platform having on opposite sides depending bearing standards, knife edge bearings located in said standards and pointing downward, plates secured to said standards and provided with upwardly pointing knife edge bearings, and a scale beam having pivots on opposite sides, each pivot being provided with upwardly and downwardly pointing knife edges coöperating with the bearings of the platform.

4. In a scale, the combination of a scale platform having on opposite sides depending bearing standards, knife edge bearings located in said standards and pointing downwards, plates removably secured to said standards and provided with the block 15 having an upwardly pointing knife edge bearing, and a scale beam having pivots on opposite sides, each pivot being provided with the upwardly and downwardly pointing knife edges 11 and 13 coöperating with the bearings 9 and 15.

5. The combination of the platform having the slotted bearing standards 8, knife edge bearings 9 in said slots of the standards, plates 14 secured to said standards and provided with the knife edge bearing blocks 15, and a scale beam provided at opposite sides with pivots, each comprising knife edges 11 and 12 connected by the block or piece 13 and coöperating with the bearings 9 and 15.

JOHN L. THEOBALD.

Witnesses:
JOHN J. HALL,
F. L. HUDSON.